Figure 1:
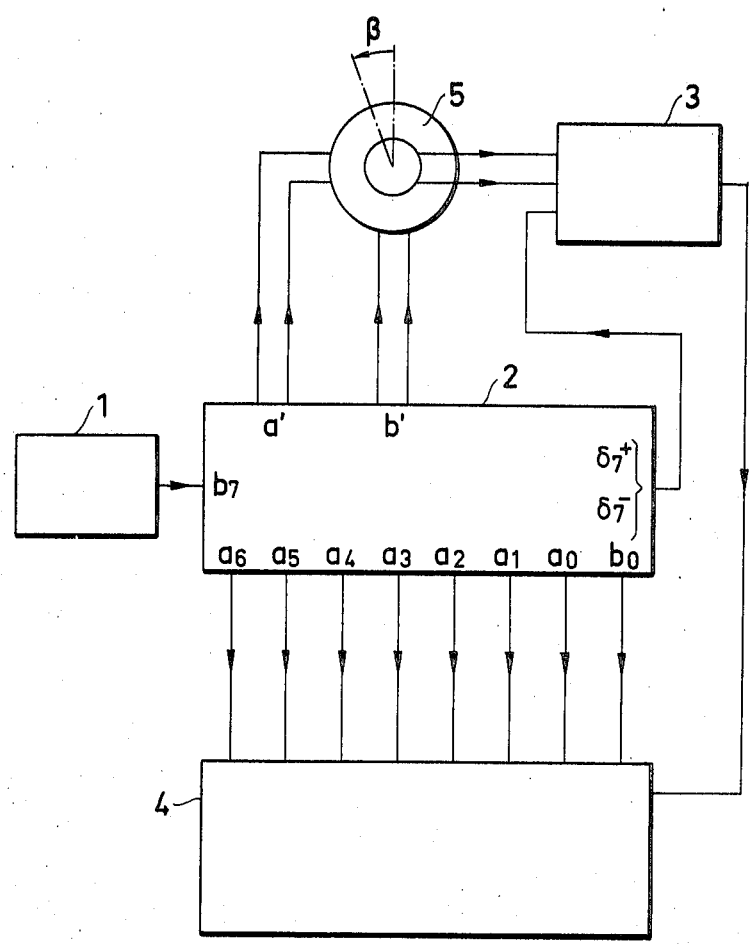

United States Patent

[11] 3,573,793

[72] Inventors Gunnar Axel Kihlberg
 Ekorrvagen, Sollentuna;
 Bo Hogstrom, Danderyd, Sweden
[21] Appl. No. 599,094
[22] Filed Dec. 5, 1966
[45] Patented Apr. 6, 1971
[73] Assignee Jungner Instrument Aktiebolag
 Stockholm, Sweden
[32] Priority Dec. 9, 1965
[33] Sweden
[31] 15,971/1965

[54] SHAFT ENCODER EMPLOYING PHASE SHIFTER DEVICE
 5 Claims, 4 Drawing Figs.
[52] U.S. Cl. ................................................. 340/347
[51] Int. Cl. ............................................. H03k 13/20
[50] Field of Search ......................................... 340/347;
 318/20.735; 235/92

[56] References Cited
UNITED STATES PATENTS
2,987,717 6/1961 Altonji et al. ................ 340/347
3,199,104 8/1965 Miller ......................... 343/12
3,255,448 6/1966 Sadvary et al. .............. 340/347

Primary Examiner—Maynard R. Wilbur
Assistant Examiner—Gary R. Edwards
Attorney—Moore and Hall ABSTRACT: In a method and apparatus for generating digital information concerning the angular position of the rotor of a phase shifter, such as a resolver or a synchro, in which a multiphase AC voltage is supplied to the phase shifter to produce a rotating magnetic field which induces a secondary AC voltage of the same frequency as the supply voltage at a phase angle proportional to the angular position of the rotor, the simultaneous readout of a large number of phase shifters can be obtained by frequency dividing a control AC voltage of a predetermined frequency to form a plurality of AC voltages, forming the multiphase AC voltage and a code which varies cyclically with the same frequency as the multiphase AC voltage from the plurality of AC voltages, whereby the position of the vector of the rotating magnetic field derived from the multiphase AC voltage corresponds to a given value of the code at any given moment; and forming readout pulse at substantially given moment; and forming readout pulse at substantially the zero transition of the secondary voltage to thereby produce a readout or registration of the cyclic code.

SHAFT ENCODER EMPLOYING PHASE SHIFTER DEVICE

In recent years a fairly large number of different methods and means for generating digital information pertaining to the angular position of a rotary member have been developed. Thus, it has been proposed, inter alia, to provide the information desired by using a phase shifter having its rotor mechanically connected or ganged, to the rotary member concerned. In this case, the phase shifter has supplied to it a multiphase AC voltage adapted to induce in the phase shifter a magnetic flux rotating at the frequency of this voltage and inducing in a secondary winding of the phase shifter an AC voltage having its phase angle varying with the angular position of the phase shifter rotor. Thereby, the angular position of the rotor can be determined by measuring the difference in phase angle between the voltage induced in the secondary winding of the phase shifter and a fixed reference voltage. Such difference can be measured in the simplest way by determining the time elapsing between the zero passages of the two voltages. For this purpose, it has been common practice hitherto to utilize a clock or timer-controlled pulse counter. If the digital information wanted is desired to be obtained in a binary form, then the ratio of the clock frequency $f'$ to the frequency $f$ of the reference voltage, or of the voltage induced in the secondary winding of the phase shifter, is determined by the equation: $f'=2^N \cdot f$ where $N$ represents the maximum number of binary digits which can be stored in the pulse counter.

One drawback of the procedure thus described resides in that the pulse counter can only be utilized for reading out the angular position of one phase shifter rotor at a time. Where simultaneous readout of a plurality of phase shifters is desired, therefore, this will have to be done either through a multiplexing procedure in which the various phase shifters are read out sequentially, or by utilizing a separate counter for each phase shifter.

The present invention has for its object to provide a novel method which is not subject to said drawback, but enables simultaneous readout of a large number of phase shifters.

The invention, more particularly, has for its object a method of generating digital information pertaining to the angular position of the rotor of a phase shifter, such as a resolver or a synchro, and in which the phase shifter is supplied with a multiphase AC voltage to excite therein a magnetic flux rotating at the frequency of this voltage and adapted to induce in a secondary winding of the phase shifter an AC voltage at the frequency of the supply voltage and at a phase angle bearing a fixed relationship to the angular position of said rotor.

The method of the invention is primarily characterized by the steps of: deriving through frequency conversion from a control AC voltage of a predetermined fixed frequency, on one hand, said multiphase voltage, and, on the other hand, a plurality of AC voltages which are utilized for forming a time-cyclic code; and causing the voltage induced in the secondary winding of the phase shifter to trigger once per cycle a readout pulse used to read out, or register, the signs of the code-forming AC voltages at the instant of occurrence of the readout pulse.

Said control voltage, as well as the code-forming voltages derived therefrom by frequency conversion, may suitably be square wave voltages of the type:

$$a_n = A_n \cdot \text{sgn} \cos (2\pi f_n \cdot t)$$

or $$b_n = B_n \cdot \text{sgn} \sin (2\pi f_n \cdot t)$$

where $f_n$ = the frequency of the voltage concerned; $t$ = time; $A_n$ and $B_n$ represent the amplitudes of the respective voltages, and the designation sgn" is defined as sgn sin $\alpha = +1$ for sin $\alpha > 0$, and as sgn sin $\alpha = -1$ for sin $\alpha < 0$, respectively.

The multiphase voltage to be fed to the phase shifter and which may be generated, for example, by using the arrangement defined in application Ser. No. 506,302, Kihlberg, now U.S. Pat. No. 3,469,172 issued Sept. 23, 1969, which is incorporated herein by reference, will be constituted by single-phase voltages in a number corresponding to the number of phases involved and being of the form:

$$v_m = V \cos (2\pi f \cdot t + \Phi_n)$$

where $f$ = the frequency of said voltages, $V$ = the amplitude, $t$ = time, and $$\varphi_m = \frac{2\pi \cdot (M-m)}{M},$$

where $M$ = the number of phases, and $m=1, 2, ..., M$.

The voltage induced in the secondary winding of the phase shifter and produced by the magnetic flux rotating at the frequency of the multiphase voltage, will be in the form:

$$v_f = V_1 \cdot \sin (2\pi f t - \beta)$$

where $V_1$ = the amplitude of the voltage induced, $f$ = frequency, $t$ = time, and $\beta$ denotes the angular position of the phase shifter rotor. This voltage, as already mentioned, is utilized for generating a readout pulse which will trigger a readout of the signs of the code-forming AC voltages at the instant of occurrence of the readout pulse.

The cyclic code formed by the voltages derived from the control voltage may be any of a variety of types. Thus, for example, it may be a binary, decimal, or a binary coded decimal code. The simplest code to accomplish, of course, is the binary type, since in this case all the code voltages, as well as the multiphase voltage to be used for feeding the phase shifter can be derived from the control voltage simply by repeated frequency division. For example, where an $N$- unit binary code is desired, the frequency of the control voltage is selected to be $2^{N+1}f$, and by repeated frequency division voltages are generated having the frequencies $2^{N}2f, 2^{N}3f, ..., 2^2f, 2f$ and $f$, these voltages being used to form both said code voltages and said multiphase voltage, the latter having the frequency $f$ allotted to it.

An important advantage of the method of the invention resides in the accurate coordination in time as obtained between the code-forming voltages and the multiphase voltage supplied to the phase shifter. A further essential advantage of the method described resides in that the code voltages and the multiphase voltage may be utilized for simultaneously determining the rotor angular position of two or more separate phase shifters.

The invention further relates to apparatus for carrying out the method defined hereinbefore, this apparatus being of the kind comprising a voltage supply unit arranged to feed at least one phase shifter with a multiphase voltage to excite therein a magnetic flux rotating at the frequency of this voltage, and adapted to induce in a secondary winding of the phase shifter an AC voltage at the frequency of the supply voltage and a phase angle related to the angular position of the phase shifter rotor.

This apparatus, in accordance with the invention, is mainly characterized in that said voltage supply unit is arranged to have supplied to it a control voltage generated by a control oscillator at a predetermined fixed frequency, and to generate by frequency conversion, in the first place, said multiphase voltage, and, in the second place, a plurality of AC voltages arranged to form a time-cyclic code, and in that a pulse generator controlled by the voltage induced in the secondary winding of the phase shifter is arranged to produce once per cycle of this voltage a readout pulse serving for trigging a readout, or registration, of the momentary signs of the code-forming AC voltages.

Figure 2:
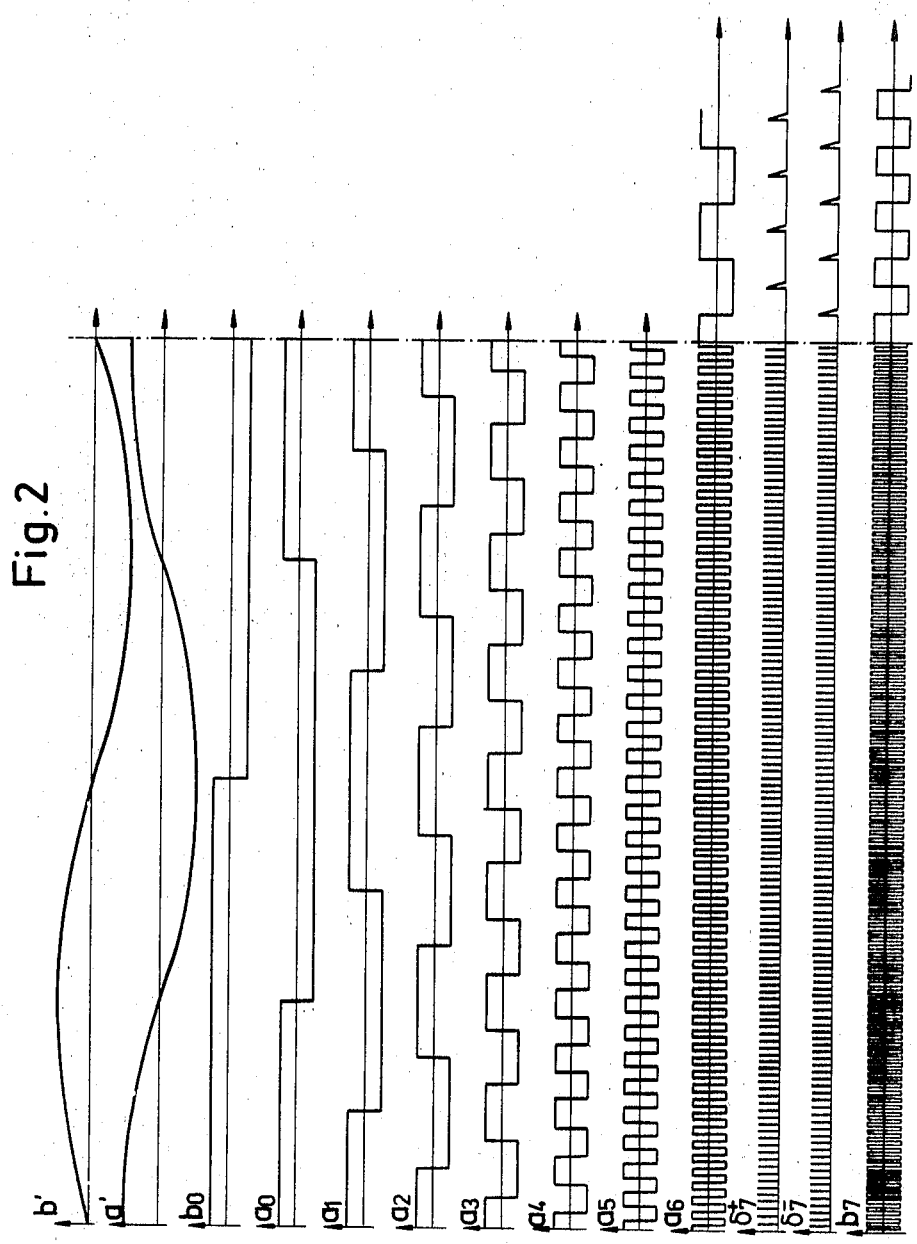
Figure 3:
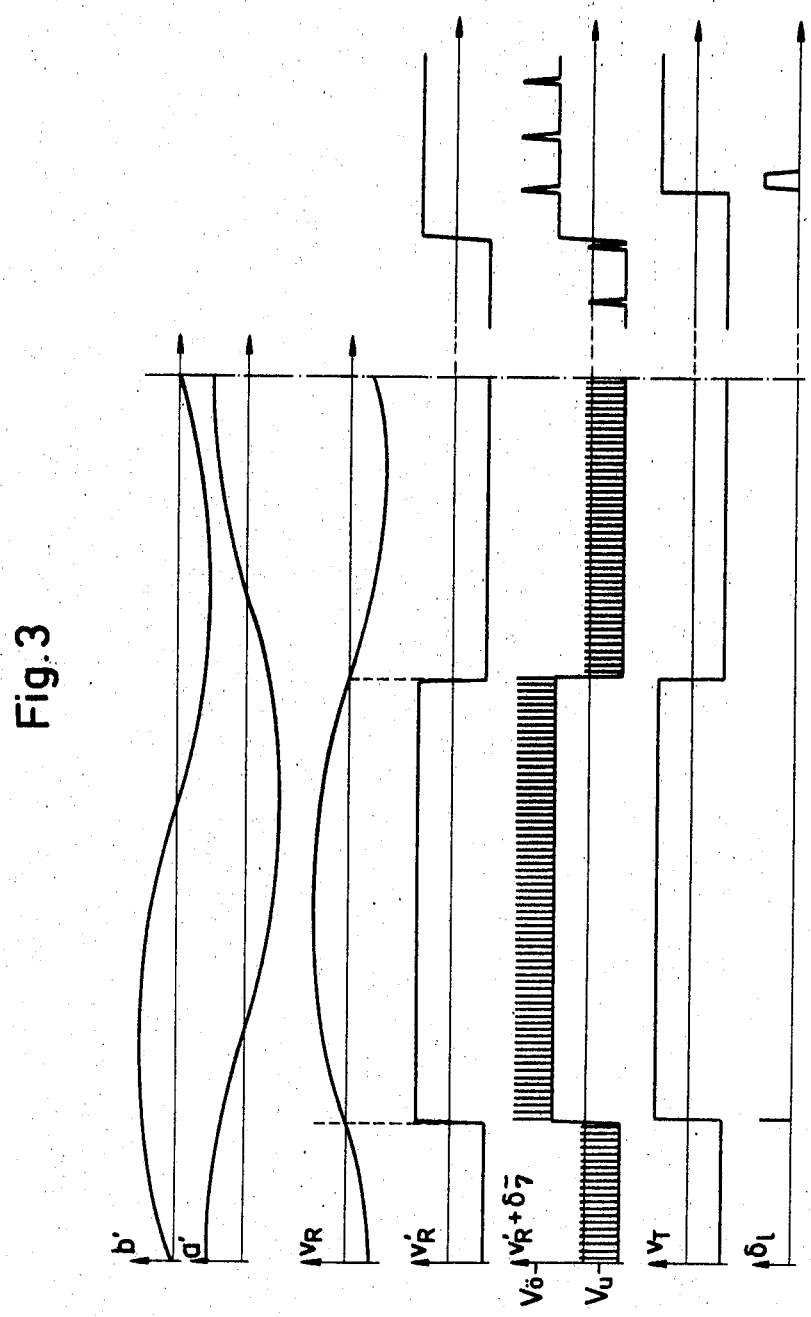
Figure 4:
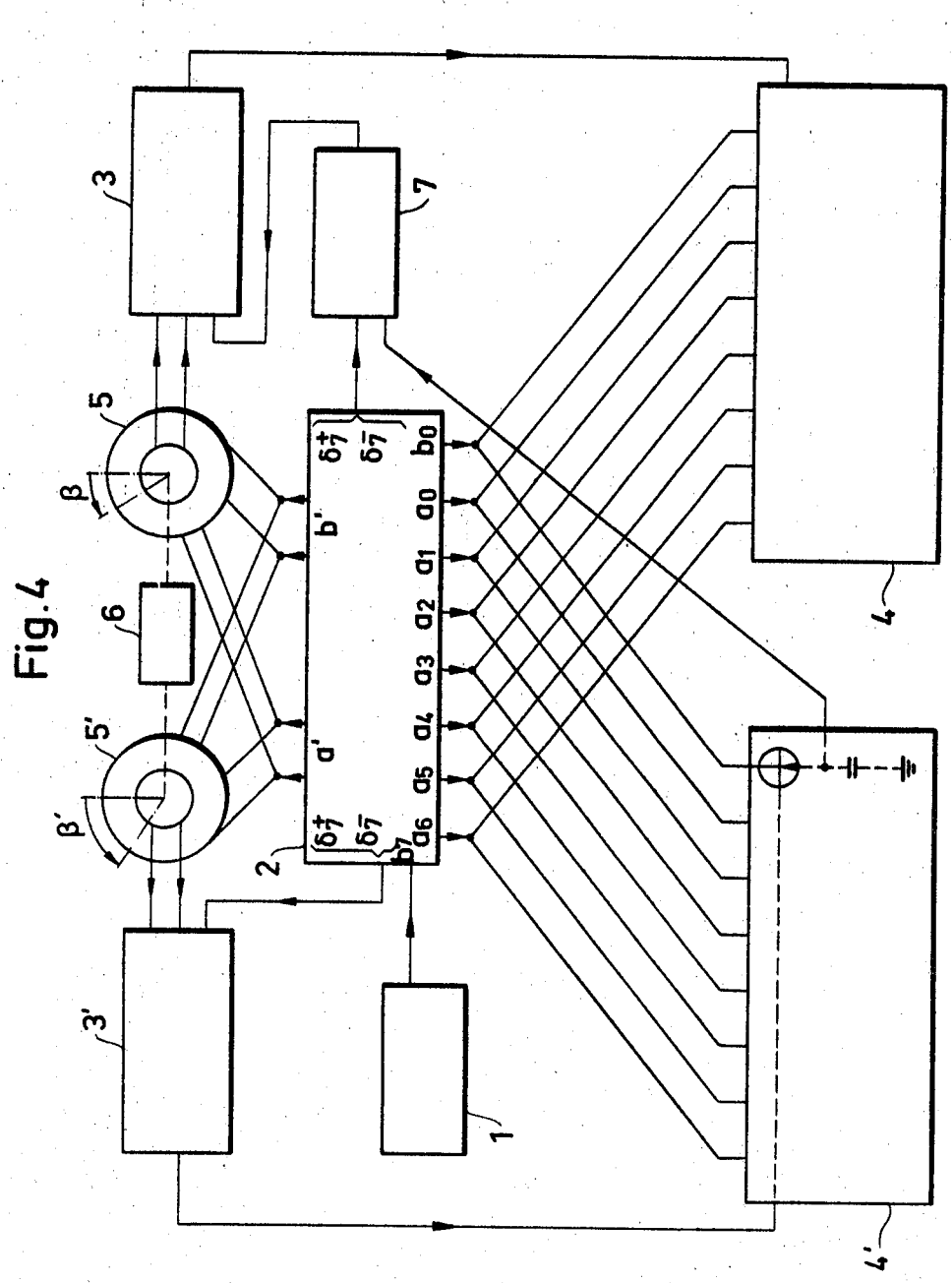

A couple of embodiments of the invention will be described hereinafter by way of example, reference being had to the accompanying drawings, in which:

FIG. 1 is a block-schematic diagram illustrating an apparatus according to the invention for generating digital information pertaining to the angular position of a phase shifter rotor, and in the form of a binary eight-unit code of the type commonly referred to as a Gray code;

FIGS. 2 and 3 are diagrams showing, by way of time functions, various voltages occurring in the apparatus of FIG. 1; and FIG. 4 is a block-schematic diagram showing a modified apparatus comprising a coarse-fine system enabling representation of the angular position of the rotor in the form of a binary 15-unit code, The apparatus illustrated in FIG. 1 comprises a master or control oscillator 1, a voltage supply unit 2, a pulse generator 3, a memory or storage 4, and a phase shifter code. The control oscillator 1 supplies to the voltage supply unit 2 a control voltage $b_7$ which is of the form:

$$b_7 = _7 \text{sgn} \sin(2^7 \cdot 2\pi f \cdot t)$$

and thus is a square wave voltage having the amplitude $B_7$ and the frequency $2^7 f$. This voltage has for its purpose to produce in the voltage supply unit 2 a plurality of voltages $a_6, a_5, a_4, a_3, a_2, a_1, a_0$ and $b_0$, these voltages being square wave voltages according to the expressions:

$$a_6 =_6 \text{sgn} \cos(2^6 \cdot 2\pi f \cdot t)$$

$$a_5 =_5 \text{sgn} \cos(2^5 \cdot 2\pi f \cdot t)$$

$$a_4 =_4 \text{sgn} \cos(2^4 \cdot 2\pi f \cdot t)$$

$$a_3 3 = A_3 \text{sgn} \cos(2^3 \cdot 2\pi f \cdot t)$$

$$a_2 =_2 \text{sgn} \cos(2^2 \cdot 2\pi f \cdot t)$$

$$a_1 = A_1 \text{sgn} \cos(2 \cdot 2\pi f \cdot t)$$

$$a_0 =_0 \text{sgn} \cos(2\pi f \cdot t)$$

$$b_0 =_0 \text{sgn} \sin(2\pi f \cdot t)$$

where $A_6, A_5, \ldots, A_0$ and $B_0$ designate the amplitudes of the respective voltages.

By means of transformers and electronic switches incorporated in the voltage supply unit and controlled by the above-mentioned voltages, there will be generated, as described more in detail in application Ser. No. 506,302, now U.S. Pat. No. 3,469,172, two sinusoidal voltages $a'$ and $b'$ which are true in phase and amplitude, being of the form:

$$a' = k' \cdot \cos(2\pi f \cdot t) \text{ and}$$

$$b' = k' \cdot \sin(2\pi f \cdot t), \text{ respectively}.$$

FIG. 2 is a diagram showing the time relationship between all of the above-mentioned voltages, the time scale at the right-hand side of the FIG. being expanded eight times relative to the time scale at the left-hand side of the FIG. In plotting this diagram, it was assumed that $B_7 = A_6 = A_5 = \ldots = A_0 = AB_0$.

The two sinusoidal voltages $a'$ and $b'$ having a relative phase shift of 90° are supplied by the voltage supply unit 2 to respective ones of two relatively orthogonally oriented stator windings (primary windings) of a resolver 5 serving as the phase shifter. These voltages will produce in the resolver a magnetic flux rotating at the frequency $f$ of said voltages, this flux inducing in a rotor winding of the resolver 5 serving as a secondary winding a voltage at frequency $f$ and of phase depending on the angular position $\beta$ of the rotor. This voltage, thus being proportional to the factor $\sin(2\pi ft - \beta)$, is supplied to the pulse generator 3 to trigger therein a readout pulse each time the voltage supplied passes through zero with a positive derivative, or rate of change. The readout pulse, in its turn, is fed to the memory 4 to cause the latter to store information as to the sign of each one of the square wave voltages $a_6, a_5, a_4, a_3, a_2, a_1, a_0$ and $b$ supplied from the voltage supply unit 2, at the instant of occurrence of the readout pulse.

In order to prevent any readout of the square wave voltages at the very instant at which any one of these voltages changes its sign, there are generated in the voltage supply unit 2, by so-called derivation of the control voltage $B_7$, two trains of pilot or synchronizing pulses $\delta_7^+$ and $\delta_7^1$ which are supplied to the pulse generator 3, the latter being so designed that the first pilot pulse, $\delta_7^+$ or $\delta_7$,[1] to occur after the voltage induced in the rotor winding of the resolver having passed through zero at a positive rate of change will trigger a readout pulse.

The above-mentioned pilot or synchronizing pulses, which are shown in the diagram of FIG. 2, have a steep leading edge and an exponentially decreasing trailing edge. Both pulse trains, in the embodiment described, are assumed to be positive voltage pulses having an amplitude which is proportional to the amplitude of voltage $b_7$. It is further assumed that the pulses $\delta_7^+$ will occur at the positive-going edges of voltages $b_7$, whereas pulses $\delta_7^1$ are assumed to be generated at the negative-going edges of said voltage.

The diagram of FIG. 3, showing the various voltages occurring in the pulse generator 3 as functions of time, illustrates the way in which the readout pulses are formed. For clarity of illustration, FIG. 3 has incorporated therein the pilot or synchronizing pulses $\delta_7^1$ only, the pilot or synchronizing pulses $\delta_7^+$ being omitted. In said diagram, $v_R$ designate the output voltage supplied from the rotor winding of the resolver to the pulse generator, $v_R'$ designate said voltage after amplification and amplitude limiting, and $v_R' + _7^1$ designates the amplified and amplitude limited resolver output voltage having the pilot pulses $\delta_7^1$ superposed thereon. The voltage $v_R' + _7^1$ is fed as an input voltage to a Schmidt-type trigger circuit having an upper trigger threshold $V_ö$ disposed between the maximum level of voltage $v_R'$ and the maximum level of voltage $(v_R' + \delta_7^1)$, and a lower trigger threshold $V_ü$ disposed between the minimum level of voltage $v_R'$ and the level defined as the sum of the minimum value of voltage $v_R'$ and the amplitude of the pulses $\delta_7^1$. The trigger circuit thus will deliver an output voltage $v_T$ which is supplied to a pulse generating circuit adapted to generate a brief readout pulse $\delta_1$ at each positive-going edge of the voltage $v_T$. The readout pulse having its leading edge substantially coincident in time with the leading edge of the pilot pulse $\delta_7^1$ which triggered said readout pulse, should be of a duration substantially shorter than half the cycle period of the control voltage $b_7$. The reason for this condition, of course, is that otherwise some of the code voltages might change its sign while readout is going on.

The memory of storage 4 may be of any type suitable for the actual purpose. For example, it may be a capacitive memory comprising capacitors in a number corresponding to the number of code voltages and arranged to have applied to them the respective code voltages, each through one transistor normally biased to cut off and caused to be transferred into its conductive state during the time of occurrence of the readout pulses.

One advantage of the arrangement of the invention resides in that the voltage supply unit may be used for simultaneously feeding a plurality of phase shifters. For this purpose it is only necessary to supplement the apparatus with one pulse generator and one memory for each of the phase shifters.

Further, it is possible in a simple way to modify the apparatus to enable readout of the angular position of the phase shifter rotor more than once per cycle of the supply voltages $a'$ and $b'$. The only measure which will have to be taken is to provide the phase shifter with one or more further rotor winding which are caused to feed the pulse generator, and the latter, in this case, must be adapted to deliver one readout pulse per winding and per cycle of the voltages induced in the windings. In this case, all of the rotor windings should be angularly displaced by $360/n$°, where $n$ designates the number of rotor windings.

A further essential advantage of the apparatus according to the invention resides in the possibility of increasing the readout accuracy by increasing the number of digital units of the code, without the necessity of increasing the number of code voltages generated in the voltage supply unit or the frequency of the control oscillator. Such an increased readout accuracy can be obtained by supplementing the apparatus illustrated in FIG. 1 by a coarse-fine system.

One example of an apparatus modified in the way just stated is constituted by the embodiment of the invention shown in FIG. 4. This system comprises a master or control oscillator 1 and a voltage supply unit 2 controlled by the output voltage supplied by said oscillator, these two units being identical with the corresponding units comprised in the apparatus of FIG. 1. As distinguished from the last-mentioned apparatus, comprising one single resolver and one single readout pulse generator controlled thereby, the apparatus of FIG. 4 comprises two resolvers 5 and 5', respectively, and two readout pulse generators 3 and 3' fed by these resolvers. The two resolvers, the one designated by 5 corresponding to the resolver of the apparatus shown in FIG. 1, are interconnected by a gearing 6 having a gear ratio of 1 to $2^7$, i.e., 1 to 128 so that the rotor of resolver 5' is caused to rotate through 128 revolutions during each revolution of the rotor of resolver 5. The readout pulse generators 3 and 3' are both arranged to have supplied to them the pilot or synchronizing pulses $\delta_7^+$ and $\delta_7^1$ generated by the voltage supply unit 2. While the pulse generator 3' is supplied with these pulses directly from the voltage supply unit, pulse generator 3, on the other hand, will have said pulses applied to it only after they have passed through a matching unit 7. The arrangement thus described, which may be said to constitute a coarse-fine system, further comprises two memories or storages 4 and 4' respectively, which are supplied, on one hand, with the code voltages $a_6$, $a_5$, $a_4$, $a_3$, $a_2$, $a_1$, $a_0$ and $b_0$ generated in the voltage supply unit 2, and, on the other hand, with readout pulses from the pulse generators 3 and 3' respectively.

The function of the system illustrated in FIG. 4 will now be described more closely.

The resolver 5, pulse generator 3 and memory 4 constitute a coarse channel, while resolver 5', pulse generator 3' and memory 4' constitute a fine channel. The interconnection between these two channels, each functioning in a manner analog to the function of the resolver 5, pulse generator 3 and memory 4 of the system of FIG. 1, are constituted, on one hand, by the gearing 6 and, on the other hand, by the matching unit 7.

The pulse generator 3' of the fine channel will supply to the memory 4' one readout pulse at each passage of the output voltage of the resolver 5' through zero at a positive rate of change. This readout pulse, being triggered by the first pilot or synchronizing pulse $\delta_7^+$ or $\delta_7^1$ to occur after zero passages of the resolver 5' output, will cause memory 4' to readout (or register) the instantaneous sign of each of the code voltages $a_6$, ...,$b_0$.

Thus, while the pulse generator 3' will continuously have supplied to it both pulse trains $\delta_7^+$ and $\delta_7$,$^1$ the pulse generator 3 included in the coarse channel will only have supplied it to either of these pulses trains at a time, since the matching unit 7 is designed, in response to the control signal supplied thereto from the memory 4' of the fine channel, to admit therethrough either the pilot pulses $\delta_7^+$ only, or the pilot pulses $\delta_7^1$ only. As control signal for the matching unit 7, a voltage derived from memory 4' is employed which contains information pertaining to the sign of the code voltage $b_0$ at the last-preceding readout of the code voltages carried out by memory 4'. If the memory 4' is of the capacitive type disclosed hereinbefore, and comprising capacitors in a number corresponding to the number of code voltages, these capacitors receiving, upon readout of the code voltages, a positive or negative voltage charge, depending on the sign of the respective code voltage at the instant of readout, then the control signal for the matching unit 7 may suitably be constituted by the voltage across that capacitor of memory 4', which is arranged to be charged by code voltage $b_0$.

The purposes of the above-described matching between the two channels is to enable an unambiguous interpretation of the information stored in the two memories 4 and 4'. The matching further involves that the accuracy of the fine channel will be determinative of the accuracy of the entire system, provided the error of the coarse channel is smaller than that corresponding to a rotation of the fine channel resolver through half a revolution. Thus, in the example described, the error of the coarse channel must be smaller than 360°/2·128 i.e. smaller than 1.4°.

When, as mentioned hereinbefore, the gear ratio between the two resolvers is selected to be 1 to $2^7$, then the information stored in memories 4 and 4' will represent a binary 15-unit number in which the first eight digits are obtained from the signs of the code voltages $b_0$, $a_0$, $a_1$, $a_2$, $a_3$, $a_4$, $a_5$ and $a_6$ as readout by memory 4, whereas the last seven digits are obtained from the signs of the code voltages $a_0$, $a_1$, $a_2$, $a_3$, $a_4$, $a_5$ and $a_6$ as read out by memory 4'. It should be observed in this connection that the information stored in memory 4' and pertaining to the code voltage $b_0$ is utilized exclusively for the above-described matching between the coarse channel and the fine channel.

Thus, by providing, in the manner described, the system with a coarse channel and a fine channel, it is possible, without increasing the frequency of the control oscillator and the number of code voltages generated in the voltage supply unit, to attain a readout accuracy corresponding to that which would be obtained from a system according to FIG. 1, if the frequency of the control oscillator was increased from $2^7f$ to $2^{14}f$, and the number of code voltages was increased from 8 to 15.

It has been assumed in the foregoing description that the two resolvers 5 and 5' are interconnected by a mechanical gearing. It would be possible, however, also to obtain the function aimed at of the system by employing a fine-resolver of the multipole type, in which case the gearing may be omitted entirely, or may have a lower gear ratio.

It should be understood, that the system described hereinbefore is susceptible of various modifications without departing from the scope of the invention. Thus, for example, instead of a binary code, any suitable other code may be employed. Further the number of digits constituting the code may be selected in any way, taking into account the readout accuracy desired.

We claim:

1. In a method of generating digital information concerning the angular position of the rotor of a phase shifter, wherein a multiphase AC voltage is supplied to said phase shifter to produce therein a rotating magnetic field which induces secondary AC voltages of the same frequency as said multiphase AC voltage and at a phase shift angle proportional to the angular position of said rotor, the improvement comprising subjecting a control AC voltage of a predetermined frequency to successive frequency division to produce a plurality of AC voltages, combining said plurality of AC voltages to form said multiphase AC voltage and forming a code which varies cylindrically with the same frequency as said multiphase AC voltage from said plurality of AC voltages, whereby the position of the vector of the rotating magnetic field produced by said multiphase AC voltage corresponds to a certain value of said code at any given moment; and forming a readout pulse substantially at the zero transition of said secondary voltage to thereby cause readout or registration of said code.

2. The method of claim 1, wherein the AC voltages derived from the control voltage form a binary $N$-unit code, the frequency of said control voltage being selected to be $2^{N_1}f$ and the code voltages derived from the frequency of said control voltage having the frequencies $2^{N_1}f$, $2^{N_1}f$....., $2^2f$, $2f$, and $f$, respectively, wherein the frequency of the multiphase voltage is equal to the frequency of $f$.

3. In an apparatus for generating digital information concerning the angular position of the rotor of a phase shifter including a voltage supply unit for producing a multiphase voltage to be applied to at least one phase shifter to produce a rotating magnetic field therein which induces a secondary AC voltage in a secondary winding of said phase shifter having a phase shift angle proportional to the angular position of the phase shifter rotor, the improvement comprising a source of a control voltage of a predetermined frequency whose output is electrically connected to said voltage supply unit, frequency division means forming a part of said voltage supply unit to produce a number of AC voltages from said control voltage, which include said multiphase voltage and a code which varies cyclically with the same frequency as said multiphase AC voltage; and a pulse generator means connected to the output of each phase shifter; said pulse generator including means for forming readout pulses substantially at the zero transitions of the secondary AC voltage induced in secondary winding of said phase shifter and supply said pulses to readout means for a readout or registration of said code.

4. The apparatus according to claim 3 wherein the secondary windings of the phase shifter are angularly spaced in relation to each other by 360°/$n$ where $n$ designates the number (of) secondary windings.

5. The apparatus according to claim 3 wherein two phase shifters from a coarse-fine system in which a certain phase shift of the coarse rotor corresponds to a multiple phase shift of the fine rotor.